Oct. 15, 1940.　　　　　H. W. BALL　　　　　2,218,412
SHEAVE BLOCK
Filed Oct. 3, 1938　　　　4 Sheets-Sheet 1
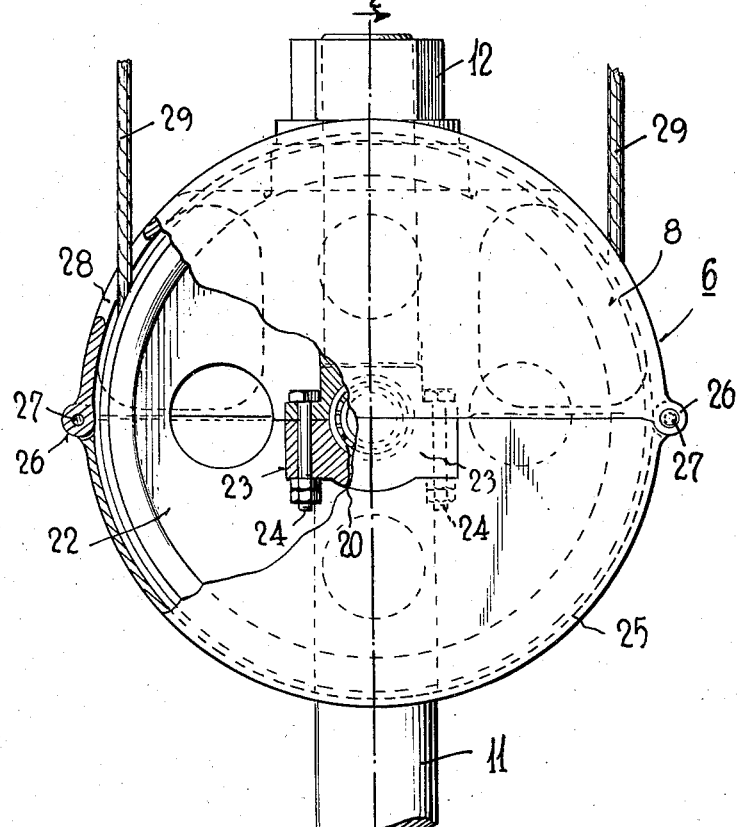
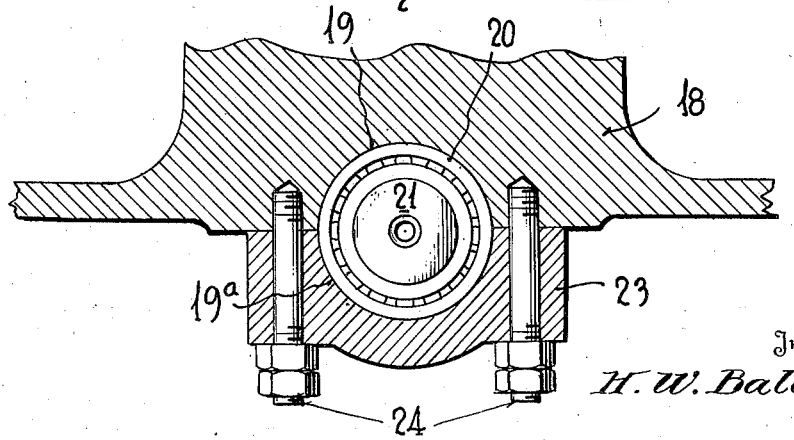

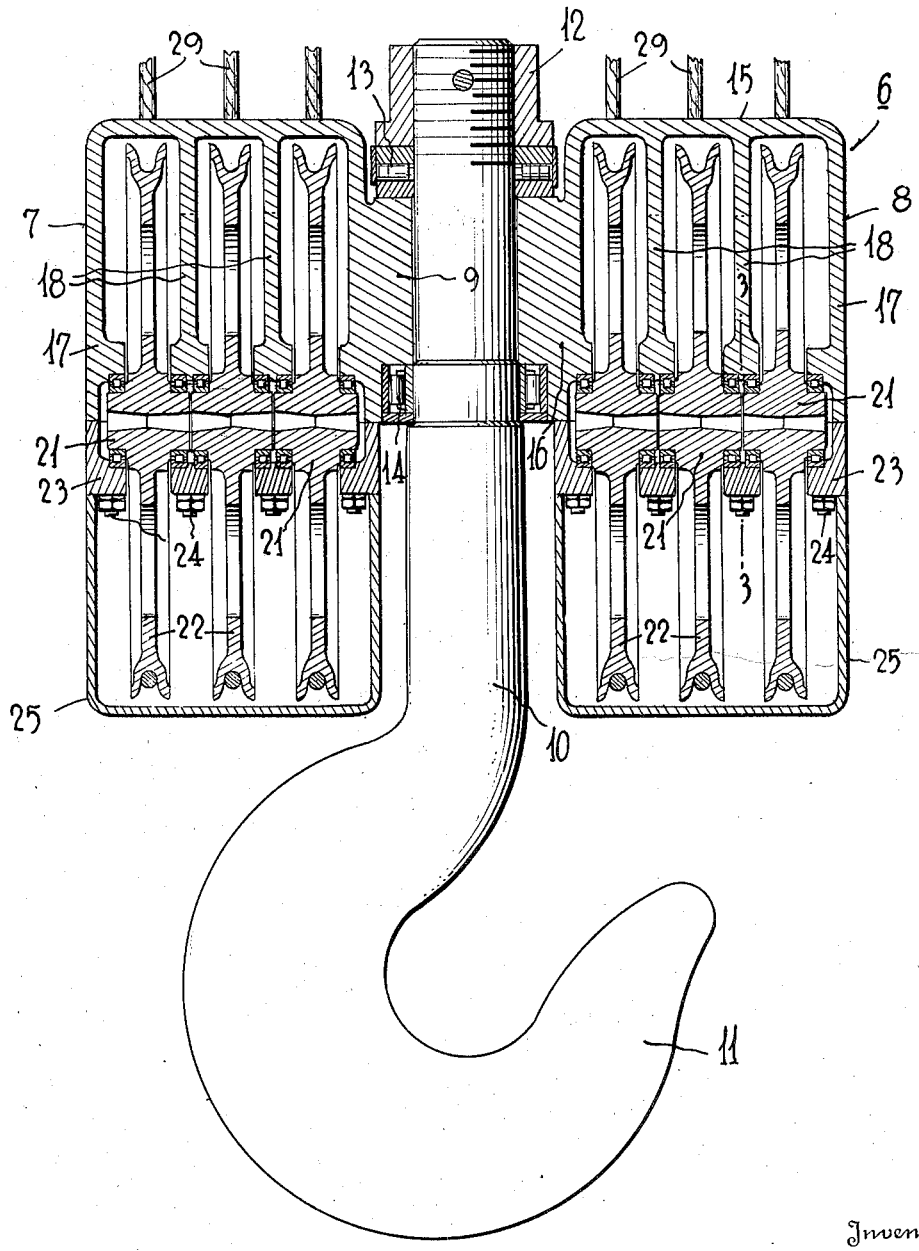

Oct. 15, 1940.   H. W. BALL   2,218,412
SHEAVE BLOCK
Filed Oct. 3, 1938   4 Sheets-Sheet 3

Inventor
H. W. Ball,

By Seymour, Bright & Nottingham
Attorneys

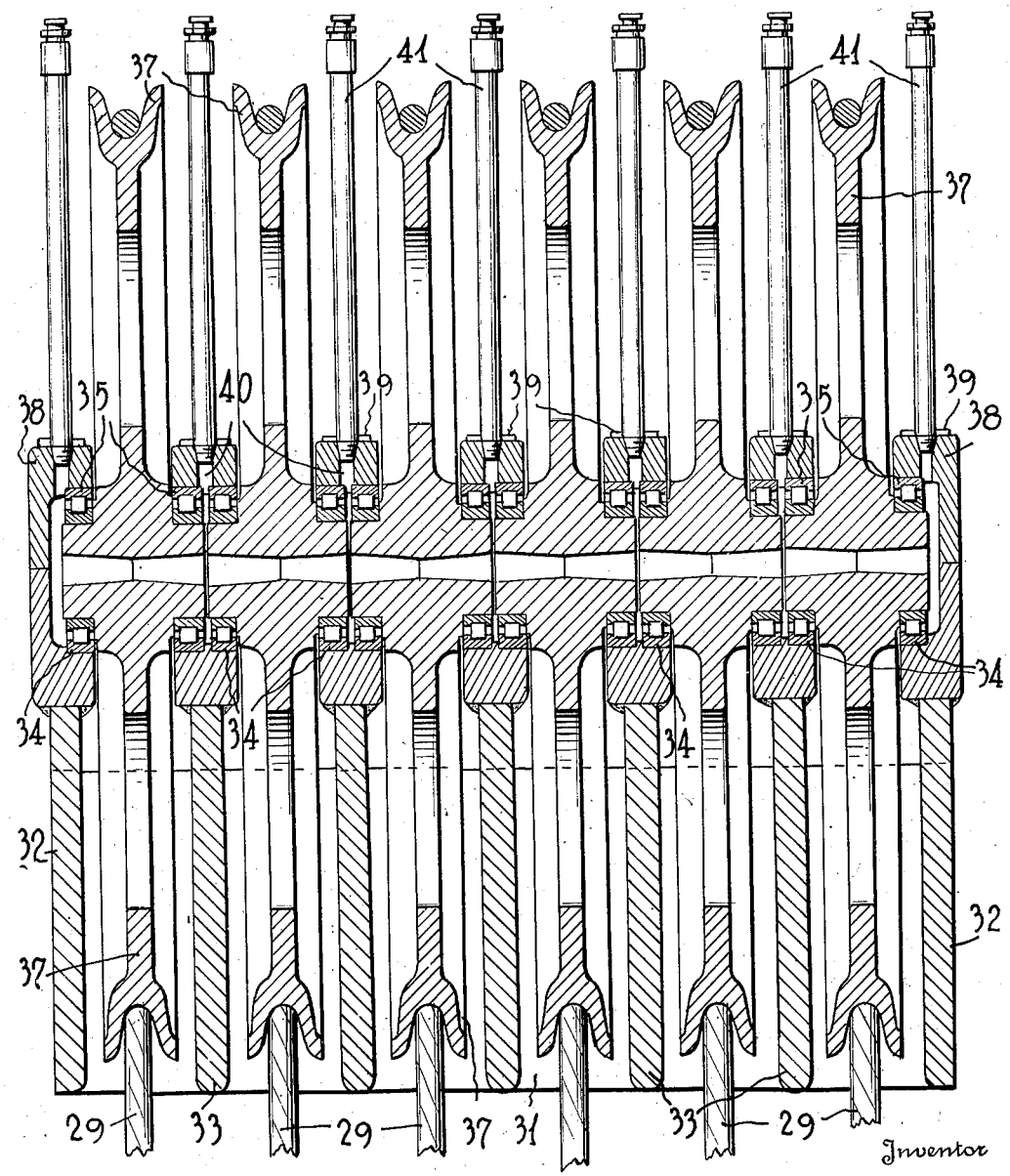

Patented Oct. 15, 1940

2,218,412

UNITED STATES PATENT OFFICE 2,218,412

SHEAVE BLOCK

Harvey W. Ball, Alliance, Ohio, assignor to The Morgan Engineering Company, Alliance, Ohio Application October 3, 1938, Serial No. 233,110

3 Claims. (Cl. 254—192)

This invention relates to improvements in sheave blocks and more particularly to novel sheave blocks of the type comprising a plurality of sheaves.

In upper and lower sheave blocks used with cranes, it has been the practice heretofore to use a long pin upon which the sheaves are mounted or assembled. Formerly the sheaves were provided with bronze bushings, but in recent years they have been mounted on anti-friction bearings. Inasmuch as the sheave supporting pin used in such structures was only supported at its ends, it is obvious that in order to obtain a sufficient factor of safety to prevent undue deflection, such pins have necessarily been of large diameter, which in turn require larger anti-friction bearings than would normally be required for the load imposed upon them. This construction of sheave blocks necessitated the use of a large heat-treated pin of expensive steel which required a great deal of expensive turning and grinding as well as drilling for lubricating purposes. Furthermore, when it became necessary with such a structure to change or replace a sheave in the block, the entire block had to be disassembled.

The primary purpose of the present invention is to provide a new construction which will eliminate such disadvantages.

Another object is to provide a sheave block which is much lighter in weight and which is so constructed as to reduce the machine work formerly required on the sheaves.

With the foregoing objects outlined and with other objects in view which will appear as the description proceeds, the invention consists in the novel features hereinafter described in detail, illustrated in the accompanying drawings, and more particularly pointed out in the appended claims.

In the drawings:

Fig. 1 is a side elevation of a lower sheave block made in accordance with my invention and partially broken away to facilitate illustration.

Fig. 2 is a transverse vertical sectional view of the same taken on the line 2—2 and with the hook shown in elevation.

Fig. 3 is a sectional view of a detail taken on the line 3—3 of Fig. 2.

Fig. 5 is a transverse sectional view of the upper sheave block taken on the line 5—5 of Fig. 4.

Figure 4:
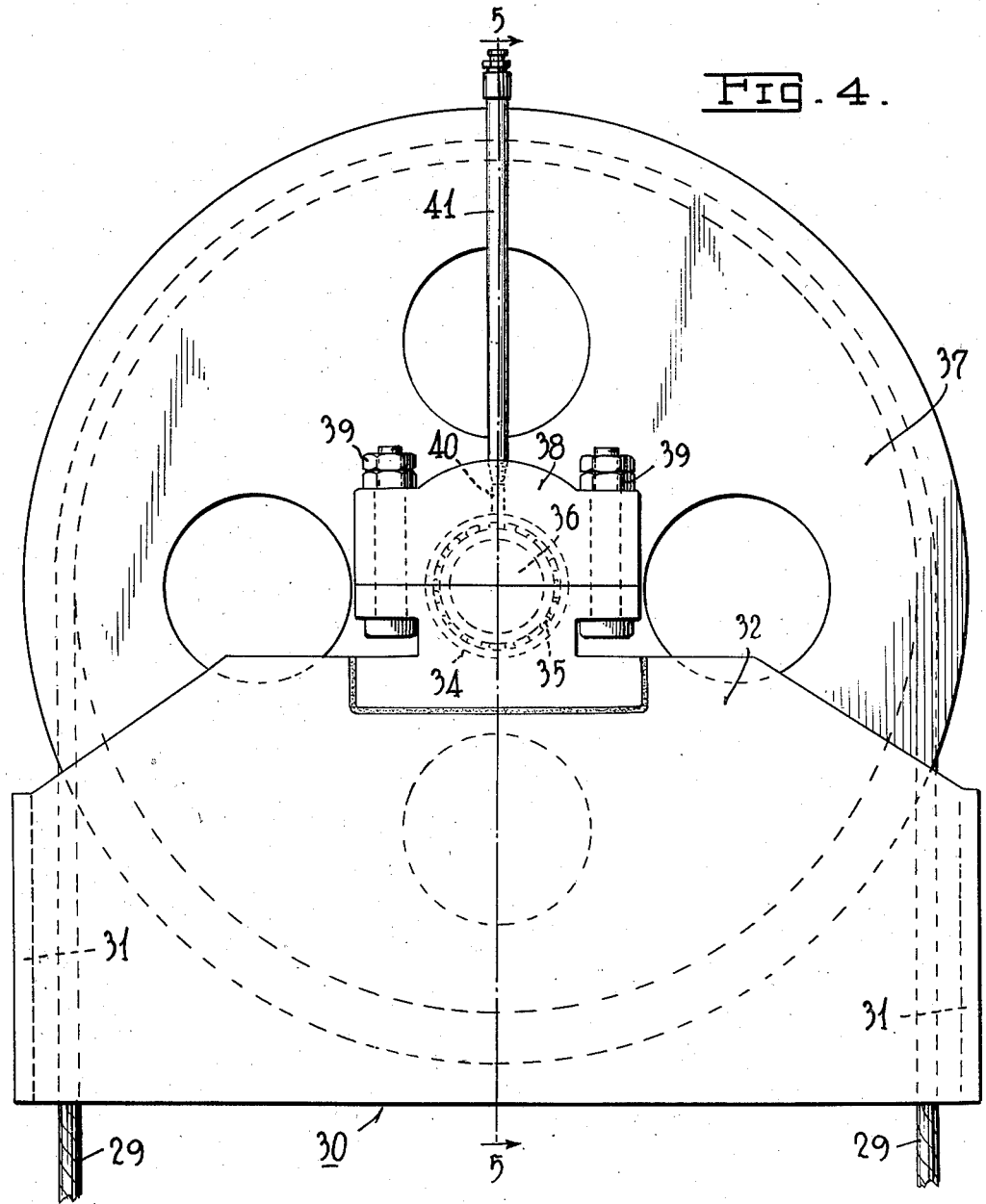
Fig. 4 is a side elevation of an upper sheave block in which the invention is incorporated.

Referring to Figs. 1 to 3 inclusive, 6 designates a casting or frame having sections 7 and 8 arranged at opposite sides of a medial bearing sleeve 9 in which the vertically disposed shank 10 of a hook 11 is swiveled. The shank extends through the bearing and is provided at its upper end with a nut 12 which rests on an anti-friction thrust bearing 13. A radial thrust bearing 14 surrounds the shank at the lower portion of the bearing sleeve.

Each of the sections 7 and 8 consists of a substantially semi-cylindrical top 15, an inner wall 16, an outer wall 17 and intermediate partitions 18. Each part 16, 17 and 18 is preferably of semi-circular shape and (Fig. 3) provided at the medial portion of its lower edge with a semi-cylindrical cavity or recess 19 to receive a portion of an anti-friction bearing 20 and a portion of a trunnion 21 of a sheave 22. The anti-friction bearings are held in contact with the surfaces 19 by means of half collars or retaining members 23 secured to the parts 16 to 18 inclusive, by any suitable means such as bolts 24. Each retaining member 23 is provided with a cavity 19a complementary to the opposed cavity 19, and of course, a portion of the bearing 20 and trunnion 21 also extends into the cavity 19a.

It will be clear from the above that the hubs of the sheaves are journalled in anti-friction bearings 20 that are removably held in place by the half collars 23, and consequently any one of the sheaves can be removed independently of the others.

If desired, each section of the frame may have its lower end closed by a semi-cylindrical door 25 having its upper edges secured to the lower edges of the complementary section by means of apertured ears 26 and retaining pins 27. In such a structure the section and its complementary door will form an enclosing casing for the sheaves.

Of course, each section will have holes 28 in its top to accommodate the cables 29 which depend from an upper sheave block and engage the sheaves 22 for supporting the lower block and its load.

In Figs. 4 and 5, the invention is shown applied to an upper sheave block and in this case a frame 30 is provided comprising parallel opposite front and rear walls 31, parallel end walls 32, and partition walls 33, the latter being arranged parallel to the end walls. Each wall 32 and 33 is provided at its upper end with a semi-cylindrical supporting surface 34 for the support of anti-friction bearings 35 in which the hubs or trunnions 36 of the sheaves 37 are journalled. Here also the anti-friction bearings and trunnions are removably connected to the frame by means of half collars or caps 38 secured in place by any suitable means such as bolts 39, two bolts being provided for each cap.

It will be manifest from the foregoing that any one of the sheaves may be removed or replaced without removing the others.

For lubricating purposes, each cap may be provided with a port 40 through which lubricant is passed to a pair of the bearings 35 by means of a tube 41.

Obviously the cables 29 which pass about the sheaves 27 extend to the lower sheave block shown in Figs. 1 to 3 inclusive.

In manufacturing my structure, I can employ sheaves of the type formerly used but instead of boring a large hole in the hub of each sheave, I turn relatively small trunnions on the present sheaves. This enables me to use smaller and cheaper anti-friction bearings inasmuch as each sheave is supported by members or partition walls extending from one side of the frame to the other.

This construction also enables me to remove an individual sheave and replace it, in case of breakage.

It also does away with the expensive lubricating system formerly used as each individual sheave has a means for lubricating its bearings through the caps that retain its trunnions.

While I have disclosed what I now consider to be preferred embodiments of the invention in such manner that the same may be readily understood by those skilled in the art, I am aware that changes may be made in the details disclosed without departing from the spirit of the invention as expressed in the claims.

What I claim and desire to secure by Letters Patent is:

1. A sheave block comprising a plurality of sections with a bearing sleeve between the same, a hook depending from the sections and having its shank swiveled in said sleeve, each section comprising a top, an inner wall, an outer wall and a partition wall, all of said walls being arranged substantially parallel to one another and each being provided at its lower edge with a cavity, a retaining member detachably secured to the lower edge of each wall, anti-friction bearings mounted in the cavities and secured in position by said retaining members, and sheaves having trunnions journalled in said bearings.

2. A sheave block of the character described comprising a substantially semi-cylindrical frame provided with at least three substantially parallel walls of semi-circular shape, each wall having a cavity at its lower edge, said cavities being in alignment, a retaining member detachably secured to each wall, positioned below the cavity of that wall and provided with a cavity complementary to the one in the wall to which the retaining member is attached, anti-friction members arranged in the cavities, sheaves having trunnions journalled in said bearings, and a substantially semi-cylindrical door connected to the frame and closing the bottom thereof.

3. A sheave block comprising a frame having a substantially semi-cylindrical roof and at least three substantially parallel spaced walls fixedly connected to said roof, each wall being of substantially semi-circular shape and provided with a lower edge portion having a cavity, anti-friction bearings extending into said cavities, sheaves having axially aligned trunnions arranged end to end, extending into the anti-friction bearings and supported thereby, adjacent trunnions of a pair of the sheaves extending into the cavity of one of said walls, and retaining members detachably secured to said edge portions of the walls and securing the trunnions and bearings to said walls, one of said members retaining the adjacent trunnions of said pair of sheaves in position.

HARVEY W. BALL.